United States Patent [19]
Nowlin, Jr.

[11] Patent Number: 5,845,138
[45] Date of Patent: Dec. 1, 1998

[54] CPU POWER MANAGEMENT IN NON-APM SYSTEMS

[75] Inventor: Dan Howard Nowlin, Jr., Hillsboro, Oreg.

[73] Assignee: Intel Corporation, Santa Clara, Calif.

[21] Appl. No.: 723,745

[22] Filed: Sep. 30, 1996

[51] Int. Cl.⁶ ........................................ G06F 1/32
[52] U.S. Cl. .................. 395/750.05; 395/750.06; 395/750.08
[58] Field of Search .............. 395/750.05, 750.06, 395/750.08, 750.03, 750.04; 364/707

[56] References Cited

U.S. PATENT DOCUMENTS 5,560,022   9/1996   Dunstan et al. ............... 395/750.01
5,590,342   12/1996  Marisetty ..................... 395/750
5,655,126   8/1997   Glenning ...................... 395/750.06

*Primary Examiner*—Meng-Ai T. An
*Assistant Examiner*—Rupal D. Dharia
*Attorney, Agent, or Firm*—Kenyon & Kenyon

[57] ABSTRACT

In order to save power in a computer system which lacks an APM BIOS or similar built-in power management facility, a power management VxD is hooked into the idle callback chain in such a way that it is the last device driver to receive an idle callback. Upon receipt of an idle callback, the power management VxD causes the CPU to enter a low-power consumption state. For processors that support a halt state, this may be done by issuing a HLT instruction to the CPU. Control returns to the power management VxD upon subsequent occurrence of an external interrupt, after which the power management VxD consumes the idle and returns control to the operating system.

10 Claims, 2 Drawing Sheets

CPU POWER MANAGEMENT IN NON-APM SYSTEMS

BACKGROUND OF THE INVENTION

The present invention relates generally to the field of computer resource management, and in particular to a method for improving CPU power management in computer systems that are not equipped with an APM (Advanced Power Management) BIOS or similar built-in power management facility. The invention is particularly well-suited for improving the power efficiency of battery-powered personal computer systems (i.e., notebook or laptop PCs).

Designers of mobile PCs are faced with two apparently-conflicting user requirements: desktop PC equivalence and long battery life. To help meet these requirements, system designers go to great lengths to maximize the power conservation capabilities of these computers. Practically every device in these systems has some level of power management capability, including hard disk drives, displays and communication ports.

Historically, the central processing unit (CPU) has been a key contributor to power consumption and heat generation in mobile computers. Chip manufacturers, such as Intel Corporation, have therefore incorporated power management features into their CPUs, such as "stop clock" and "halt" states. This technology allows a very high MIPS/Watt ratio average, which provides a good measure of a mobile PC's power efficiency. For example, a Pentium®90 processor running the Windows®95 operating system draws approximately 6–7 watts when operating at full capacity; however, when Windows®95 is idle and the CPU is primarily in a halt state, consumption drops to just 1 watt.

Unfortunately, even with the sophisticated power management techniques now employed, higher processor speeds and state-of-the-art hardware such as Advanced Graphics Ports and DVD drives will likely cause mobile PCs to reach their maximum thermal dissipation limit (i.e., approximately 20 watts) within the next few years. To make matters worse, battery technology has tended to improve at a much slower rate than the increasing power requirements of mobile PCs, resulting in shortened battery life. Additional ways of conserving power must therefore be found to help combat these trends.

The present invention is primarily, though not exclusively, directed to a Windows®3.1/95 operating environment. Power management in a Windows® environment is typically done cooperatively among three layers of software, as shown in FIG. 1. At the bottom-most software layer is the APM (Advanced Power Management) BIOS, which controls power to the various system hardware components (e.g., hard disk, chipset, CPU). Just above the BIOS level is the Windows®3.1/95 operating system itself. At the top of the software stack are the various applications running on the system.

The APM BIOS provides a system-independent interface for performing power management on computer systems employing an Intel® Architecture. The specific way in which computer systems handle APM calls will vary among system implementations. For example, the APM BIOS may handle certain built-in devices such as the video monitor differently from platform to platform. The APM BIOS specification intentionally avoids defining how to perform power management at the device level, in favor of abstractly allowing a power driver to request various device power activities.

Among the APM BIOS' specified functions is the "CPU Idle" API (Application Program Interface) call, which allows the CPU to be placed into a low-power state. The APM BIOS normally does this by executing an "HLT" instruction which turns off some of the internal circuitry of the CPU until the next external interrupt. On an idle Windows®3.1/95 system, the HLT instruction is executed about once every 13.7 ms and the CPU remains in a low-power state approximately 98% of the time. While executing HLT is the usual method for saving processor power, several CPU chipsets provide support for other power-saving mechanisms, such as "Stop Clock." The APM BIOS specification allows BIOS vendors to tailor functionality to particular platforms.

In APM-equipped systems, the Windows®3.1/95 power driver VPOWERD provides a means of communication between the APM BIOS and the operating system. This power driver is integrated into the core VMM.VxD driver. VPOWERD exports several APIs which give the operating system access to the power saving features of the APM BIOS, including the above-mentioned CPU_Idle call. Whenever Windows®3.1/95 detects that all loaded software, drivers, and the operating system itself are idle, the operating system makes a CPU_Idle call via VPOWERD. By this call, the operating system is said to be in the idle state and has given control to the APM BIOS to save power.

Applications usually do not participate directly in power management activities, although methods do exist within Windows®3.1/95 by which software may play a more active role in that regard. Nevertheless, applications can have a significant impact on the operating system's ability to enter the idle state—the operating system cannot enter the idle state until all loaded software is idle.

For an application to enter the idle state, it must voluntarily give control back to the operating system. This is normally done by calling a Windows® blocking API, such as GetMessage or WaitMessage. Calls to these APIs tell the operating system to return only when the application has a message or event to process. On the other hand, there are certain Windows® APIs that do not enter this blocking state, such as PeekMessage. Such APIs return to the calling application immediately whether or not there is a message waiting. Under these circumstances, Windows® believes that the application has more processing to do and will not enter the idle state. This allows the application to have full use of the CPU until the application calls on of the blocking APIs or is preempted by the operating system.

Once all applications have entered their idle state, Windows®3.1/95 gives the virtual device drivers (VxD) in the system the opportunity to perform any necessary idle processing. To provide this opportunity, the VMM (Virtual Machine Manager) calls a list of pre-registered VxD idle callback addresses, know as the "idle callback chain." If a VxD wants to prevent the system from idling, it returns from the idle callback with its carry flag clear. This act of preventing idle is called "consuming idle" or "eating idle." If, on the other hand, the VxD returns with its carry flag set, the operating system knows that, at least as far as that particular VxD is concerned, it is permissible for the system to enter the idle state. When all the VxDs in the idle callback chain are idle (i.e., return with carry flag set), VPOWERD calls the APM BIOS using the CPU_Idle function to conserve power.

Unfortunately, not all Windows®-based computer systems are equipped with APM. In the absence of the APM BIOS, Windows®3.1/95 cannot call the CPU_Idle function when it determines that the system is idle. Thus, after the VMM completes processing of the idle callback chain, the operating system does nothing other than return from the idle handler. The CPU simply continues to run at full speed, with no power savings whatsoever. Such inefficient use of power is unacceptable in battery-powered computer systems where every wasted watt unnecessarily shortens battery life.

SUMMARY OF THE INVENTION

The present invention provides a method for performing power management in a computer system which is not equipped with an APM BIOS or similar built-in power management facility. According to an embodiment of the invention, a power management VxD is installed as an intermediary between the VMM and the CPU, enabling the power management VxD to cause the CPU to enter a low-power state when it detects that the computer system is idle. This configuration is achieved by hooking the power management VxD into the idle callback chain such that the power management VxD is the first device driver to request an idle callback, and thus the last device driver to receive an idle callback.

When the operating system determines that all loaded applications are in an idle state (e.g., waiting for keyboard input, waiting for a mouse event, waiting for a message), the VMM begins sequentially processing the idle callback chain, sending an idle callback to each device driver that had requested to be informed of an idle state. Each device driver then has an opportunity to perform desired idle-time processing. Since the power management VxD will be the last device driver to receive an idle callback, it may assume that all other device drivers have completed their idle-time processing. The power management VxD can then initiate power management.

In an embodiment directed to a computer system with a CPU that supports a halt state, such as a Pentium® processor, the power management VxD accomplishes power management by using the HLT command to place the CPU into its low-power state. The CPU remains in this state until the occurrence of an external interrupt, which causes control to return to the power management VxD. The power management VxD then returns control to the operating system.

DETAILED DESCRIPTION

The present invention provides a method for performing power management in a computer system which is not equipped with an APM (Advanced Power Management) BIOS or other integrated power management facility, and is primarily directed to optimizing power management in battery-powered PCs. The invention is described herein with reference to computer systems operating in a Windows®3.1/95 environment, but may be equally beneficial in other environments.

Figure 1:
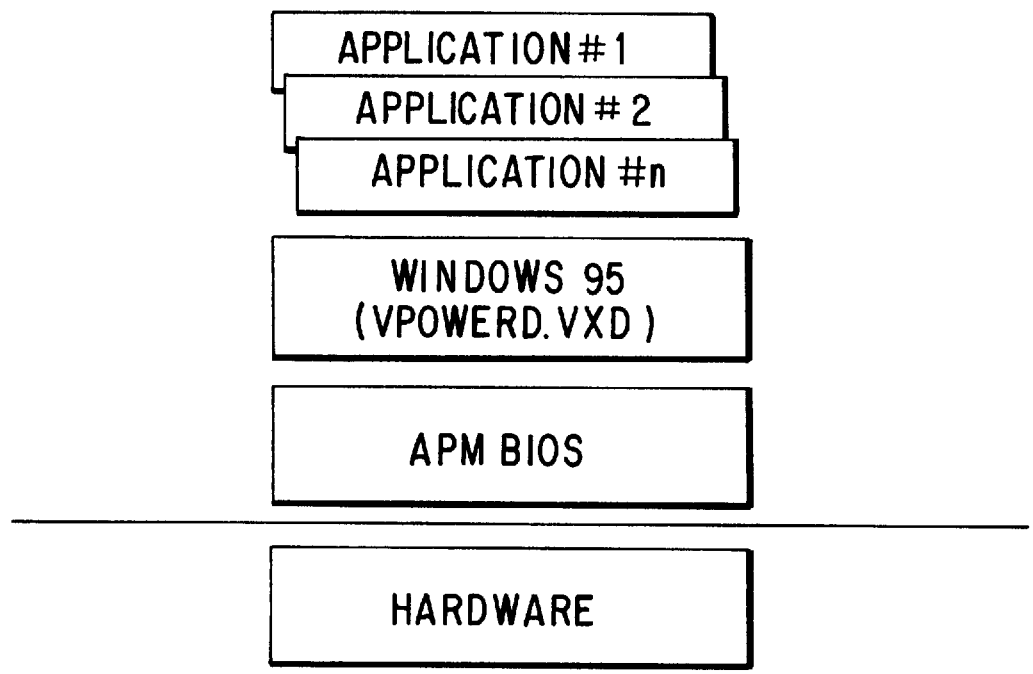
FIG. 1 illustrates the multi-layer power management architecture of a typical Windows®3.1/95 system.
Figure 2:
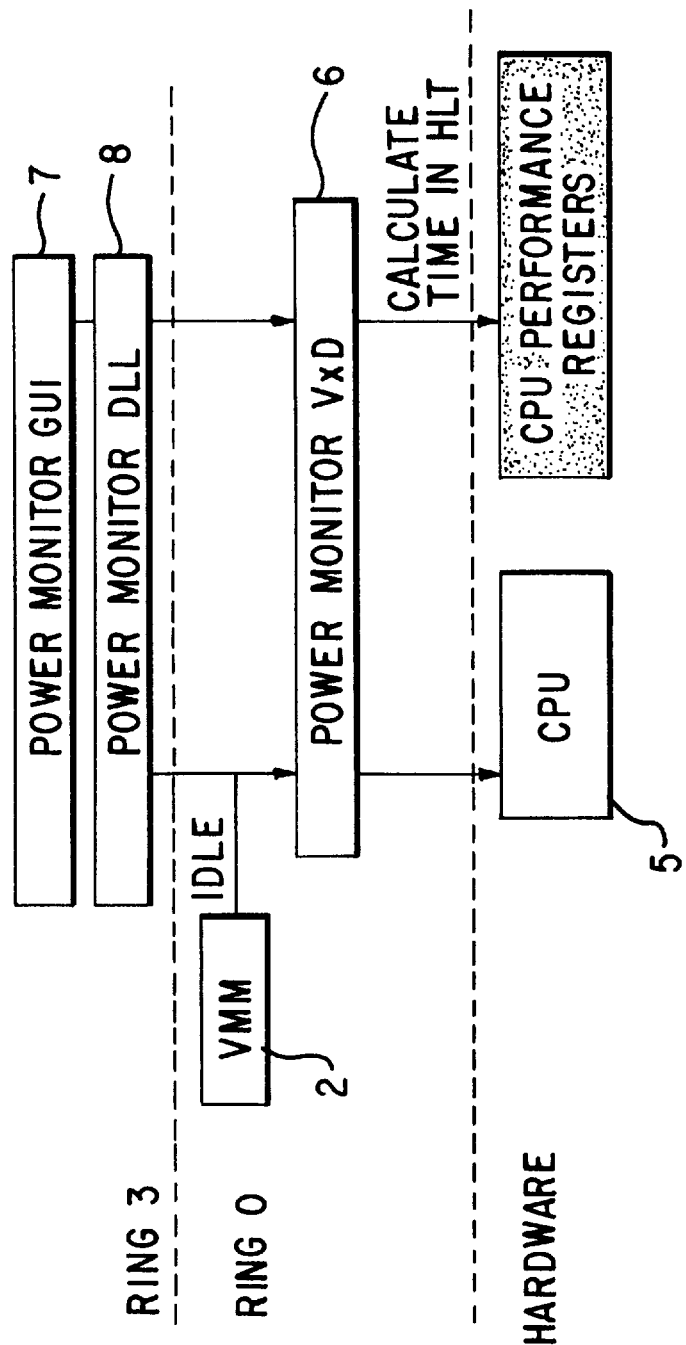
FIG. 2 is a block diagram depicting an embodiment of the present invention.

Referring now to FIG. 2, the present invention provides a means by which a computer system 1 lacking an APM BIOS can perform power management during system idle times. In a system of this type, the operating system (not shown) is capable of detecting when all of the loaded applications are in an idle state (i.e., waiting for a message, waiting for a mouse/keyboard event). Once this condition is detected, the operating system invokes the VMM 3 to provide any loaded virtual device drivers, or VxDs, with the opportunity to perform idle-time processing. The VMM 3 then sequentially processes a list of pre-registered VxD idle callback addresses, known as the "idle callback chain." A called VxD will perform its desired processing and then return control to the VMM 3. If the VxD wishes to prevent the system from idling, it returns to the VMM 3 with its carry flag clear. This act of preventing idle is called "consuming idle" or "eating idle," and results in the VMM 3 terminating its processing of the idle callback chain. If, on the other hand, the VxD returns to the VMM 3 with its carry flag set, the VMM 3 continues processing the idle callback chain.

In a computer system equipped with an APM BIOS, the last VxD in the idle callback chain will be the Windows® power driver VPOWERD. The primary function of VPOWERD is to call the APM BIOS with a CPU_Idle function code, which causes the APM BIOS to initiate power-saving processing such as executing an HLT command to place the CPU into a low-power state. In a system without an APM BIOS, however, when the VMM 3 completes processing the idle callback chain, control simply returns to the operating system. No power-saving activities are performed.

To address this problem, the present invention provides a mechanism for causing the CPU 4 to enter a low-power state when the system is idle. According to the embodiment shown in FIG. 2, a power management VxD 2 serves as an intermediary between the VMM 3 and the CPU 4. This is preferably accomplished by "hooking" the power management VxD 2 into the idle callback chain managed by the VMM 3. To hook the idle callback chain, the power management VxD 2 must call the VMM 3 with a Call_When_ Idle function code, passing the VMM 3 a callback address corresponding to the location of the power management VxD 2.

The power management VxD 2 determines that the computer system 1 is idle by virtue of its position in the idle callback chain; that is, if the power management VxD 2 is the last device driver to receive an idle callback from the VMM 3, it may safely assume that all applications running on the computer system 1 are suspended and all of the loaded device drivers have completed their idle-time processing without consuming the idle. To ensure this desired position at the end of the idle callback chain, the power management VxD 2 is given an extremely low load order by setting an appropriately-low initialization order value. Each time the computer system 1 is started (i.e., "booted"), the power management VxD 2 will be the first device driver loaded. This allows the power management VxD 2 to be the first device driver to make a Call_When_Idle call, which ensures that the power management VxD 2 will be the last device driver to receive an idle callback from the VMM 3.

The power management VxD 2 may be configured to perform any power-saving functions supported by the CPU 4; however, very little processing is necessary to provide significant power savings. For example, where the CPU 4 supports the HLT command, as is the case with any of Intel's Pentium® processors, the power management VxD 2 may simply execute the HLT command to place the CPU 4 into a low-power state.

After receiving the HLT instruction, the CPU 4 will remain in a low-power state until occurrence of an external interrupt. This causes the CPU to "wake up," at which time control returns to the power management VxD 2. The power management VxD 2 then consumes the idle by returning to the VMM 3 with its carry flag clear. The VMM 3 consequently returns control to the operating system.

As the foregoing description demonstrates, the present invention provides an effective means for conserving power in a computer system that lacks a built-in power-management utility such as APM. The invention is highly beneficial for battery-powered computer systems, given the ever-increasing functionality demands placed on such systems without corresponding increases in battery capabilities.

What is claimed is:

1. A method for conserving power in a computer system lacking an integrated power management facility, the computer system including a processor capable of operating in a reduced power consumption mode, said method comprising the steps of:

(a) loading a power management virtual device driver (VxD) onto the computer system, including assigning a lowest initialization order value to said power management VxD;

(b) hooking said power management VxD into an idle callback chain of the computer system such that said power management VxD receives an idle callback after all other loaded device drivers receive idle callbacks; and (c) upon receipt of an idle callback by said power management VxD, executing an instruction from said power management VxD which causes the processor to enter the reduced power consumption mode.

2. The method of claim 1, wherein said step of hooking said power management VxD into said idle callback chain comprises instructing a virtual machine manager to call said power management VxD during processing of said idle callback chain.

3. The method of claim 1, wherein said step of causing said processor to enter said reduced power consumption mode further comprises passing control to said processor prior to initiation of said reduced power consumption mode and receiving control back from said processor upon termination of said reduced power consumption mode.

4. The method of claim 3, wherein said instruction causes said processor to enter a halt state.

5. A computer system configured for operating in a low-power state in the absence of an integrated power management BIOS, said computer system comprising a processor capable of operating in a reduced power consumption mode, a virtual machine manager controlling one or more virtual device drivers loaded on the computer system, wherein said virtual machine manager sequentially invokes said one or more virtual device drivers using an idle callback interrupt chain, and a power management driver, said power management driver comprising a virtual device driver which is assigned a lowest initialization order value to said power management driver and including program code for causing said processor to operate in said reduced power consumption mode upon receipt of a signal indicating that said computer system is in an idle state, said siginal comprising an idle callback signal propagated through said idle callback interrupt chain.

6. The computer system of claim 5, wherein said power management driver is installed at a first end of said idle callback interrupt chain, such that said power management driver receives said idle callback signal after all other of said one or more virtual device drivers have received said idle callback signal.

7. The computer system of claim 5, wherein said program code comprises a command instructing said processor to enter a halt state.

8. A method for conserving power in a Windows®-based computer system lacking an APM BIOS, the computer system including a processor capable of operating in a reduced power state, an operating system, and a virtual machine manager which processes an idle callback chain when the operating system determines that all active software routines are in an idle state, said method comprising the steps of:

(a) loading a power management virtual device driver (VxD) onto the computer system, said power management VxD having a lowest load order of all loaded virtual device drivers;

(b) hooking said power management VxD into the idle callback chain such that said power management VxD receives an idle callback after all other loaded virtual device drivers receive idle callbacks;

(c) causing said processor to enter its reduced power state upon receipt of an idle callback by said power management VxD, wherein said power management VxD passes control to said processor;

(d) terminating the reduced power state of said processor upon occurrence of an external interrupt, wherein said processor passes control back to said power management VxD; and (e) instructing the virtual machine manager to terminating processing of the idle callback chain.

9. The method of claim 8, wherein said step of causing said processor to enter its reduced power state comprises passing an HLT instruction to said processor.

10. The method of claim 9, wherein said step of hooking said power management VxD into the idle call back chain comprises calling the virtual machine manager with a Call_When_ldle instruction.

* * * * *